United States Patent Office.

C. H. MITCHELL, OF BRISTOW STATION, KENTUCKY.

Letters Patent No. 64,787, dated May 14, 1867.

IMPROVED MEDICAL COMPOUND.

*The Schedule referred to in these Letters Patent and making part of the same.*

TO ALL WHOM IT MAY CONCERN:

Be it known that I, C. H. MITCHELL, of Bristow Station, in the county of Warren, in the State of Kentucky, have invented a new and improved Mode of Curing Flux. I do hereby declare that the following is a full and exact description thereof, reference being had to the accompanying ingredients.

To enable others skilled in the art to make and use my invention, I will proceed to describe the ingredients and their operation.

It consists of extract of hyosciamus, sulphate of morphia, pulverized gum camphor, and essence of cinnamon, in such proportions that each dose contains four grains extract hyosciamus niger, half a grain of camphor, one-eighth of a grain of sulphate of morphia, and five drops of essence of cinnamon.

The foregoing is the dose for an adult. Half the quantity for a child ten years of age; one-fourth the quantity to a child five years of age; to those younger, one-eighth the quantity, to be repeated every three hours until relieved; then three times a day until cured.

As to the *modus operandi* of the different ingredients, it is fully described in any of the Dispensatories which are kept in the drug stores.

What I claim as my invention, and desire to secure by Letters Patent, is—

The compound made of the aforesaid remedies, for curing disease as specified.

C. H. MITCHELL.

Witnesses:
    C. E. BLEWETT,
    W. H. BLEWETT.